United States Patent [19]

Anderson et al.

[11] 4,264,943

[45] Apr. 28, 1981

[54] HOLLOW CORED CAPACITOR

[75] Inventors: Daniel J. Anderson; Charles E. Pennington, both of Indianapolis, Ind.

[73] Assignee: Emhart Industries, Inc., Indianapolis, Ind.

[21] Appl. No.: 17,998

[22] Filed: Mar. 7, 1979

[51] Int. Cl.³ .......................... H01G 9/00; B01J 17/00
[52] U.S. Cl. .................................. 361/433; 361/272; 29/570
[58] Field of Search ...................... 361/433, 271, 272; 29/570

[56] References Cited

U.S. PATENT DOCUMENTS

| | | | |
|---|---|---|---|
| 3,439,234 | 4/1969 | Braiman et al. | 361/433 |
| 3,564,347 | 2/1971 | Peck | 361/433 |
| 3,680,203 | 8/1972 | Braiman et al. | 361/433 |
| 3,697,824 | 10/1972 | Greskamp | 361/433 |
| 4,170,812 | 10/1979 | Rayno | 361/433 |

*Primary Examiner*—Andrew J. James
*Attorney, Agent, or Firm*—Robert F. Meyer; David W. Gomes

[57] ABSTRACT

A wound capacitor having at least two conductive layers with non-conducting spacer layers disposed between them. Means for conducting electricity is attached to each of the conductive layers. An open hollow cored member having a flange extending outwardly from it has the layers wound around it and on one side of the flange with the hollow cored member remaining open. A member cofitting with the hollow cored member and flange sealingly encloses the layers. The means for conducting electricity extend out from the formed enclosure.

8 Claims, 2 Drawing Figures

HOLLOW CORED CAPACITOR

FIELD OF THE INVENTION

The present invention relates to wound capacitors and more particularly to low cost, long life, wound capacitors having hollow cored members.

BACKGROUND OF THE INVENTION

Capacitors, which perform many electronic functions, are manufactured using various materials, methods and designs. One of the more common types of capacitors made is the wound capacitor which can be either of the electrolytic or non-electrolytic type.

Wound capacitors generally contain at least two layers of a conductive material, such as a metal foil, with at least one non-conducting spacer layer disposed between adjacent layers of conductive material all wound into a roll and generally protectively packaged. Attached to each conductive layer is means for conducting electricity. Such means generally include at least one metallic lead or tab.

Wound electrolytic capacitors, in addition, contain a quantity of an electrolyte between the conductive layers with the various electrolytes used being well known in the art. Each conductive layer generally comprises a metal foil with an oxide layer formed on some or all of the surfaces of the metal foil.

Wound capacitor rolls and their packaging are usually in a compact cylindrical shape. In most electrical device applications, however, there is sufficient space within the electrical device for all components thereof, including capacitors, thus making the shape of the capacitor relatively unimportant. In some situations, capacitors of other shapes such as oval or flat have been used in order to more efficiently utilize volume within an electrical device when such volume is of an irregular shape and space is at a premium.

Though various capacitor shapes have been utilized, the construction of hollow cored capacitors for use within definite space restrictions entails various problems and difficulties. Known capacitor construction techniques do not produce a satisfactory hollow cored capacitor. Thus, for example, the use of an extra large mandrel during winding produces a hollow cored capacitor roll, but with the roll being too easily deformed during handling. Such capacitor rolls, which are easily distorted may be subject to detrimental variations in capacity and other performance characteristics as a result of such distortions. Further, it is difficult to properly package hollow cored capacitor rolls since generally known packaging techniques encapsulate the entire capacitor rolls and they do not produce a finished capacitor with a hollow core. Known packaging techniques for electrolytic capacitors generally entail such complete encapsulation of the capacitor roll in order to provide reliable seals which prevent electrolyte loss since prevention of electrolyte loss is essential in order to prevent premature capacitor failure.

THE INVENTION

It has now been found that it is possible to make a satisfactory hollow cored capacitor having requisite electrical characteristics. Such a capacitor is thus able to fit into a space that would be inadequate for other capacitors. For example, such hollow cored capacitors may be placed in a narrow space surrounding another component within the electrical device using the capacitor.

The hollow cored capacitor can be successfully manufactured in almost any required size and shape by using a hollow cored member whereby at least one pair of conductive layers, and one or more non-conductive spacer layers, disposed between the conducting layers, are wound upon such member. Means for conducting electricity into and out of the conductive layers are attached to the conductive layers at any time before, during or after winding.

The invention will be more fully understood from the following discussion, as well as with reference to the accompanying drawings.

DESCRIPTION OF THE DRAWINGS

Figure 1:
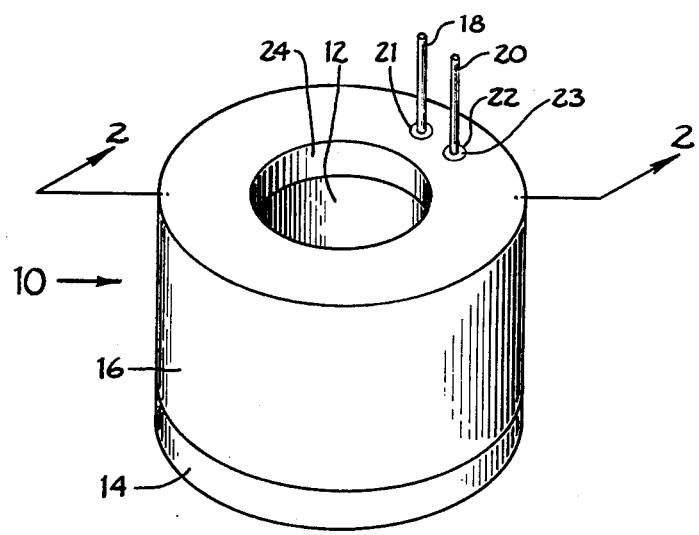
FIG. 1 is an isometric view of a preferred embodiment of a hollow cored capacitor of the present invention.
Figure 2:
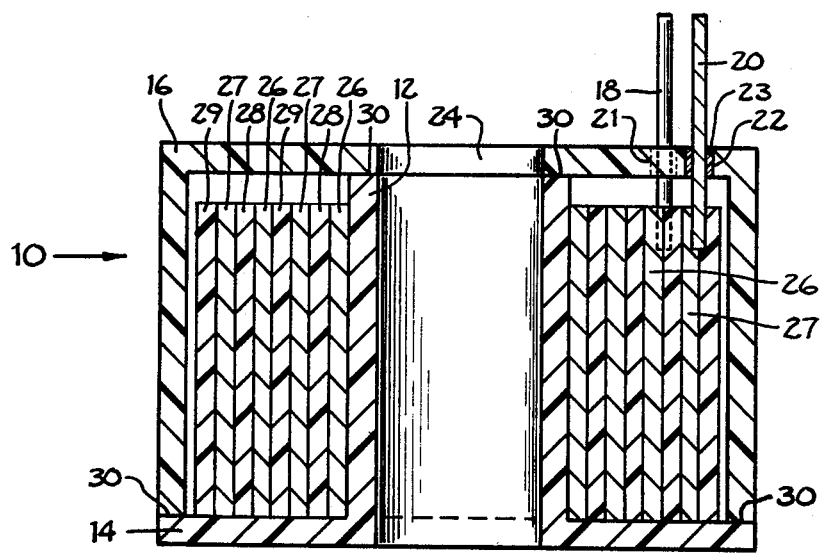
FIG. 2 is a cross sectional view of the capacitor shown in FIG. 1 along line 2—2.

Referring to the drawings, a capacitor 10 shown in FIGS. 1 and 2 comprises an open cylindrical hollow cored member 12 with flange section 14 at one end thereof and a cofitting cup-shaped member 16 with aperture 24 therein in a sealing relationship with the peripheral ends of the hollow cored member 12. Aperture 24 is of a diameter equal to that of the inner diameter of the hollow member 12 so that the members 12 and 16 abut each other at the periphery of aperture 24 whereby they can be joined in a sealing relationship. A pair of leads 18 and 20 extend through apertures 21 and 22 respectively in member 16 and comprise means for conducting electricity into and out of the capacitor 10. A potting compound 23, such as one of the various silicones, epoxies, waxes and other sealing materials compatible with other components within the capacitor 10, seals the space surrounding leads 18 and 20 within aperture 21 and 22 respectively.

Though leads 18 and 20 are shown as extending from the top of the capacitor they may extend at any point from the capacitor 10, as required by the capacitor user. Leads 18 and 20 comprise means for conducting electricity such as wires, tabs or terminals. Further, in addition to leads 18 and 20, other leads or means for conducting electricity may be employed as desired.

The embodiment shown in FIGS. 1 and 2 is an electrolytic type capacitor, which type is preferred in many applications because of its higher capacity per unit of volume. Non-electrolytic type capacitors can also be manufactured using the hollow cored member 12 of the present invention.

In FIG. 2, layers of conducting 26 and 27 and non-conducting 28, and 29 materials are attached to and wound onto the hollow cored member 12. The cup shaped member 16 is shown in a sealing relationship with hollow cored member 12 at the peripheral ends of member 12, thereby forming an enclosure for the layers 26, 27, 28 and 29. Conductive leads 18 and 20, are shown as being attached to layer 26 and layer 27 respectively.

The use of the hollow cored member 12 permits known winding equipment and known manufacturing methods to be utilized in the manufacture of the capacitor 10 of the present invention. Thus, for example, member 12 may be attached to a mandrel in the winding machine with the various layers attached to member 12. Layers 26-29 are preferably attached to member 12 before winding to facilitate such winding. The ends of the layers 26-29 may be generally attached directly to member 12 with a piece of tape (not shown) having an adhesive compatible with the other components of the capacitor 10. The capacitor roll may be then wound in a manner similar to winding of other wound capacitors. A significant advantage of the present invention is that existing equipment and methods may be easily utilized therewith, thereby facilitating production and reducing costs.

Conducting layers 26 and 27 which are wound around member 12 are each preferably comprised of a metal foil, most preferably of a valve metal such as aluminum, with oxide layers (which function as dielectric) being formed on some or all of the surfaces of metal foils 26 and 27.

The non-conducting spacer layers 28 and 29 shown disposed between conducting layers 26 and 27 are preferably absorbent and ionically permeable. Examples of useful non-conducting materials include paper, permeable plastics such as cellulose acetate, or generally any other suitable non-conducting material having absorption and ionically permeable characteristics.

A preferred embodiment of the capacitor 10 further includes an electrolyte disposed between the conducting layers 26 and 27. Useful electrolytes include acetic and maleic acids as well as other polar materials known in the art and which are selected to meet the requirements of the capacitor user.

During assembly and subsequent handling of the wound layers 26-29, such layers will not, because of the support supplied by the hollow cored member 12, easily deform. Thus, with the wound layers retaining their shape, such wound layers will generally not deviate from the required physical and electrical tolerances. Cup-shaped member 16 and flange 14 of member 12 supply additional support to the capacitor 10, and further protect and prevent deformation of the wound layers during handling and use.

The rigidity of the hollow cored member 12, flange 14 and cup-shaped member 16 depends on the thickness and type of material used in their fabrication. The minimum rigidity of these components depends on the type of use and handling that the wound layers 26-29 and finished capacitor 10 may be subject.

Hollow cored member 12 is shown as a substantially continuous cylinder with an annular flange 14 at an end thereof. Annular flange 14 is shown as an integral portion of the member 12 extending perpendicularly from one end of the member 12. The layers 26-29 are on the side of flange 14 adjacent the cylindrical portion of member 12. Flange 14 can also originate as a separate component. The location of the flange 14 on the member 12 can be varied, if desired, by the capacitor user. Further, the flange 14 can be in any shape desired by the user, and not only the annular ring shown in FIG. 2. Other hollow cored members with different configurations or shapes are also within the ambit of the present invention.

Cup-shaped member 16 may vary in accordance with changes in configuration of hollow cored member 12 such that the wound layers 26-29 are enclosed thereby.

Cup-shaped member 16, as well as member 12 with flange 14, may be comprised of any material compatible with the other components of the capacitor 10. Many metals, their alloys and most plastics have such compatibility and many of these materials are now routinely used in the manufacture of capacitors. Generally, materials may be selected on the basis of cost, ability to be formed into the required shape, and ability to form and maintain a seal.

A preferred material is polypropylene since it is highly inert to common capacitor electrolytes and to the conducting and nonconducting layers 26-29 of the capacitor 10. Polypropylene is low in cost, easily formed into the required shapes and has sufficient rigidity to prevent the capacitor 10 from being deformed during handling.

Polypropylene can also be easily and hermetically sealed to itself, preferably through the use of ultrasonic welding techniques. This property permits member 16 to be easily attached to the member 12 with flange 14. Seal 30 at the peripheral ends of member 16 and flange 14 may be quickly and inexpensively effected by the above preferred methods. Further, seal 30 made by such methods, is highly reliable in maintaining its integrity during use and in preventing loss of electrolyte from the capacitor 10.

The use of the hollow cored member, in electrolytic capacitors, results in an increased surface area with which an electrolyte contained within the capacitor is in contact. Significant loss of electrolyte may result if the material containing such electrolyte is detrimentally permeable to the electrolyte. It is therefore preferred that such container material be substantially impermeable to such electrolyte. Polypropylene in addition to the above preferred properties is essentially non-permeable and is for this reason preferred as well.

Other plastic materials may be substituted for polypropylene if they are compatible with the other constituents of the capacitor 10, have the desired impermeability and can be reliably sealed at low cost. Other materials, such as metals, which also have a very low porosity are more difficult to seal with a high reliability. The more sophisticated seals required for metal containers also greatly increase the cost of the finished capacitor 10 and are accordingly less preferred.

The large surface area per unit of volume of the hollow cored capacitor when compared to the more usual totally enclosed capacitor additionally results in a higher power handling capability. The larger surface area permits a much higher rate of cooling for the hollow cored capacitor, and helps to prevent heat build-up at the center of the capacitor, since heat can more easily be removed from the center thereof. Despite the shortcomings previously enumerated, metals or other materials having high heat conductivity, if used for the member 12, flange 14 and cup-shaped member 16, will accentuate the power handling capabilities of the capacitor 10 by permitting rapid heat transfer and cooling.

Besides higher heat dissipation, the capacitor 10 also exhibits a reduced inductance (compared to totally encapsulated capacitors of similar capacity). The reduced inductance improves the high frequency properties of the hollow cored capacitor and results from the reduced number of turns of the various layers 26-29 caused by the use of the hollow cored member 12.

The preceeding description and the accompanying drawings are for illustrative purposes only. It is understood that changes and variations in the size, shape and materials of the capacitor can be made without departing from the spirit and scope of the present invention as defined in the following claims.

What is claimed is:

1. A wound capacitor comprising at least two conductive layers with non-conductive spacer layers disposed between said conductive layers, means for conducting electricity attached to each of said conductive layers, a hollow cored member and a flange integral with and extending outwardly from said hollow cored member, said conductive layers with non-conductive spacer layers being wound around said hollow cored member on one side of said flange, and said capacitor further comprising a cup-shaped member cofitting with said hollow cored member and said flange, whereby said hollow cored member, flange, and cup-shaped member form a sealed enclosure for said layers and wherein said means for conducting electricity extend out of the sealed enclosure.

2. The capacitor of claim 1 wherein said hollow cored member comprises an open cylinder.

3. The capacitor of claim 1 wherein each of said conductive layers comprises a metal foil.

4. The capacitor of claim 3 wherein said metal foil comprises a valve metal.

5. The capacitor of claim 4 wherein said valve metal is aluminum.

6. The capacitor of claim 4 and further comprising an electrolyte disposed between said metal foil layers.

7. The capacitor of claim 6 wherein said hollow cored member is comprised of polypropylene.

8. The capacitor of claim 7 wherein said hollow cored member and the flange are hermetically bonded to said cup-shaped member.

* * * * *